United States Patent [19]

Nelson et al.

[11] 4,330,315
[45] * May 18, 1982

[54] METHOD AND APPARATUS FOR PREHEATING PULVEROUS MATERIALS PRIOR TO THEIR INTRODUCTION INTO A MELTING FURNACE

[75] Inventors: Frederick J. Nelson, Swanton; Raymond S. Richards, Sylvania; Robert R. Rough, Sr., Toledo, all of Ohio

[73] Assignee: Owens-Illinois, Inc., Toledo, Ohio

[*] Notice: The portion of the term of this patent subsequent to Aug. 25, 1998, has been disclaimed.

[21] Appl. No.: 213,766

[22] Filed: Dec. 5, 1980

Related U.S. Application Data

[63] Continuation-in-part of Ser. No. 183,655, Sep. 2, 1980, abandoned.

[51] Int. Cl.³ .............................................. C03B 3/00
[52] U.S. Cl. ....................................... 65/27; 65/134; 65/335; 165/2; 165/101; 165/103; 165/104.18
[58] Field of Search ................ 65/27, 134, 335; 165/2, 165/101, 103, 106

[56] References Cited

U.S. PATENT DOCUMENTS

| | | | |
|---|---|---|---|
| 3,172,648 | 3/1965 | Brichard | 65/335 X |
| 3,185,554 | 5/1965 | Sweo et al. | 65/335 X |
| 3,607,190 | 9/1971 | Penberthy | 65/27 X |
| 3,788,832 | 1/1974 | Nesbitt et al. | 65/134 |
| 3,880,639 | 4/1975 | Bodner et al. | 65/134 |
| 4,045,197 | 8/1977 | Tsai et al. | 65/27 |
| 4,113,459 | 9/1978 | Mattmuller | 65/335 X |
| 4,184,861 | 1/1980 | Erickson et al. | 65/134 X |
| 4,285,717 | 8/1981 | Novak | 65/27 X |

Primary Examiner—Arthur D. Kellogg
Attorney, Agent, or Firm—E. J. Holler; M. E. Click; D. H. Wilson

[57] ABSTRACT

The present invention relates to method and apparatus for improving the preheating of pulverous materials, their introduction into melting furnaces, and their melting therein, with application to the recycling of some of the vitrifiable starting materials delivered to a tank furnace for glass making through a heat exchanger to raise its entry level temperature.

32 Claims, 2 Drawing Figures

METHOD AND APPARATUS FOR PREHEATING PULVEROUS MATERIALS PRIOR TO THEIR INTRODUCTION INTO A MELTING FURNACE

CROSS-REFERENCE TO RELATED APPLICATION

This application is a continuation-in-part application of pending U.S. patent application Ser. No. 183,655, filed Sept. 2, 1980, now abandoned in the name of the same inventors and having the same title, which application is assigned to the same common assignee as the present application.

BACKGROUND OF THE INVENTION

1. Field of the Invention

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, the starting materials are subjected to heating only after they have been introduced into the furnace where they receive, at high temperature, the quantities of heat necessary for heating them, for ensuring completion of the endothermic reactions, and for imparting thereto sufficient fluidity to ensure homogenization and refining of the resultant molten glass mass. It has been observed in glass making that the greater part of the heat delivered to the starting materials is directed to increasing the temperature of the starting materials rather than to producing the reactions. In most known methods, the starting materials are deposited on top of the molten bath and are subjected to radiation from the flames circulating with great turbulence above them. Since the newly-introduced materials are poor conductors of heat, the heat exchange is poor which slows the melting process.

The present invention especially relates to increasing the efficiency and output of glass melting installations, and provides means whereby a glass melting furnace may be operated continuously and uniformly at full capacity or beyond, if desired. Apparatus is provided for preheating the thoroughly-mixed, glass-forming ingredients before the same are supplied to the melting furnace, and preferably utilizing the heat of the waste gases from the melting furnace in such preheating of the glass mixture, and causing continuous passage of the glass mixture through the preheater to the melting furnace.

The invention comprises an improved process and means for practicing the process to accomplish the aforesaid objects, and in the provision of an improved arrangement of apparatus for preheating the glass mixture and for utilizing waste gases from glass melting furnaces, or hot preheated air from such furnaces, as more fully set forth in the following specification and as particularly pointed out in the appended claims.

The provision of the preheater for the glass mixture enables the utilization, for heating the same, of the heat in the waste gases from the melting furnace which otherwise would go to waste up the stack. While the use of hot waste gases is preferred to operate the preheater, preheated air from the furnace heat-recovery "checkers" area which is used for combustion, or a supplemental heat source such as an oil or gas burner, alone or in combination, may be used to heat the air or waste gases for operating the preheater. Also atmospheric air may be heated to operate the batch preheater. The provision of the preheater, continuously delivering glass mixture at a proper predetermined elevated temperature, to a furnace, which is used with either continuous or batch processes, permits more uniform operation of the furnace with a significant increase in efficiency of operation and in the output of the furnace.

2. Description of Prior Art

There is a considerable number of earlier-issued U.S. patents which deal with initially preheating the glass mixture prior to its delivery into the glass furnace. U.S. Pat. No. 3,607,170 to Malesak discloses method and apparatus in which the glass mixture is preheated in a non-oxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the quantity and rate of flow of the fumes in the preheating zone are in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace and transferred by heat pipes to an enclosure in which incoming glass batch materials are preheated prior to being fed to a furnace for melting. The heat pipes contain metallic sodium as the working fluid.

U.S. Pat. No. 3,788,832 to Nesbitt et al, and U.S. Pat. No. 3,880,639 to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other exhausted effluent so that there is no unpredictable relationship between varying amounts of waste heat and the amount of heat provided for preheating unmelted batch materials.

A considerable number of other patents relate to the direct heat exchange between incoming batch materials and exhaust gases from a glass melting furnace. These patents are: U.S. Pat. No. 3,607,190-Penberthy, U.S. Pat. No. 4,026,691-Lovett, U.S. Pat. No. 3,526,492-Motsch, U.S. Pat. No. 3,350,213-Peyches, U.S. Pat. No. 1,543,770-Hilbert, U.S. Pat. No. 3,753,743-Kakuda, U.S. Pat. No. 1,610,377-Hitner, and U.S. Pat. No. 4,099,953-Rondeaux. Many techniques have been disclosed in the patent literature for direct and indirect heat exchange between hot exhaust gases from a glass melting furnace and incoming batch materials; however, none is capable of achieving the results attainable by the present invention.

DESCRIPTION OF THE PREFERRED EMBODIMENT

Figure 1:
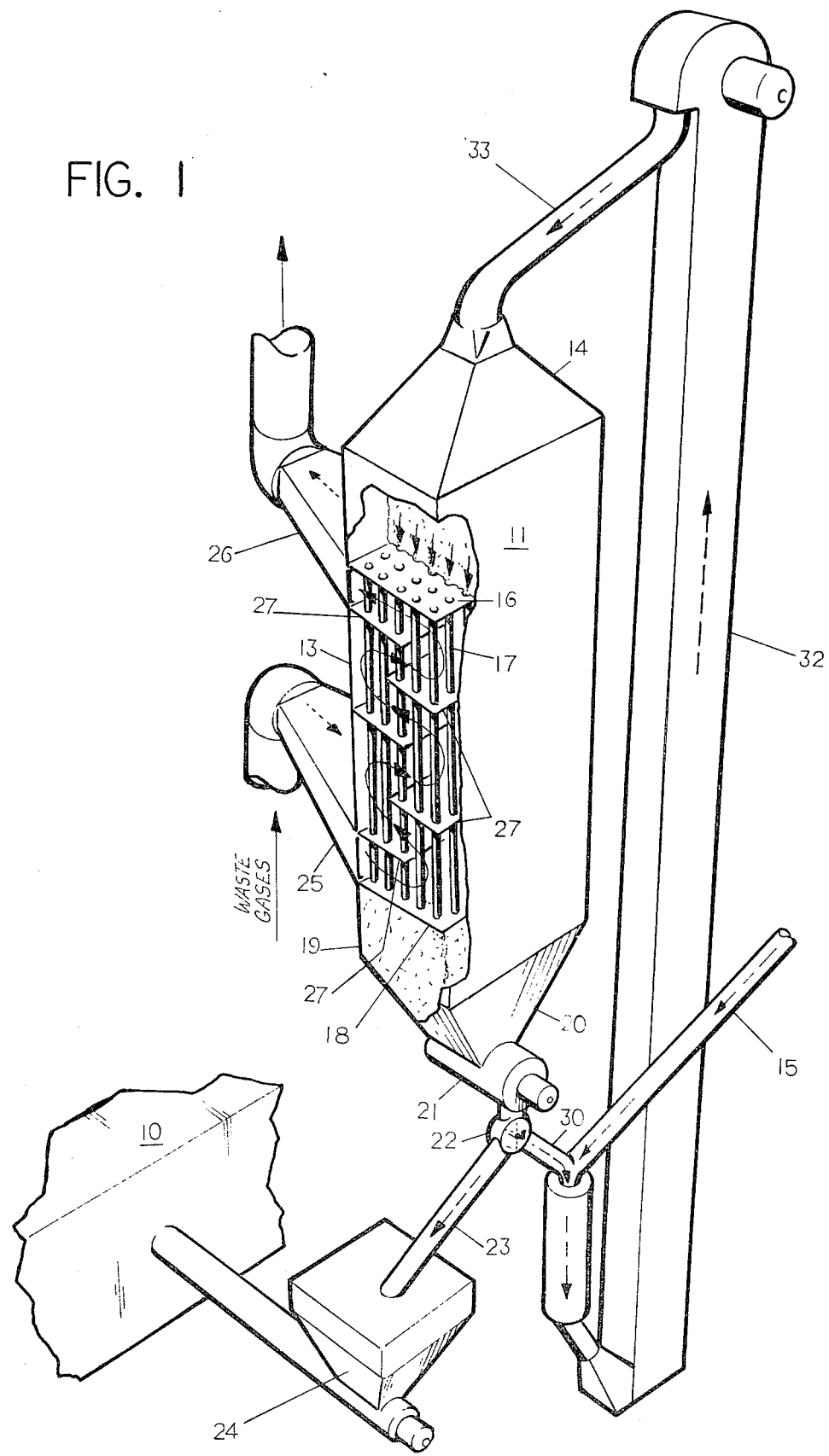
FIG. 1 is a perspective view partially broken away of the glass batch preheater apparatus for practicing the present invention.
Figure 2:
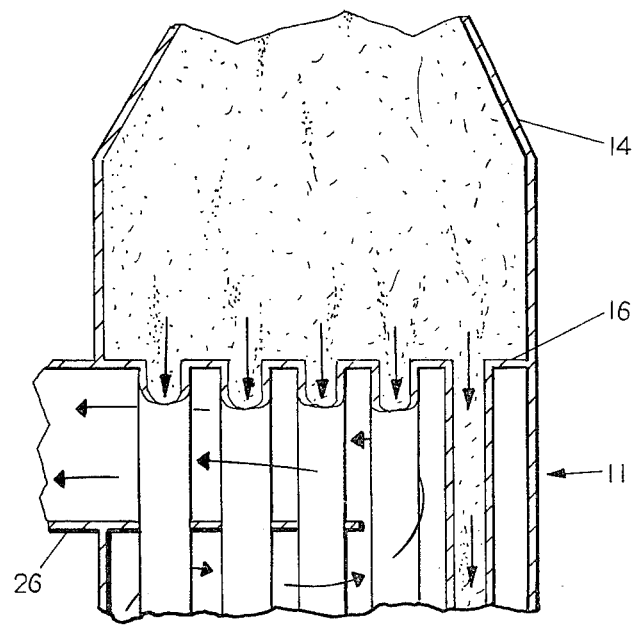
FIG. 2 is an enlarged fragmentary vertical sectional view of the preheater apparatus shown in FIG. 1.
Figure 2:
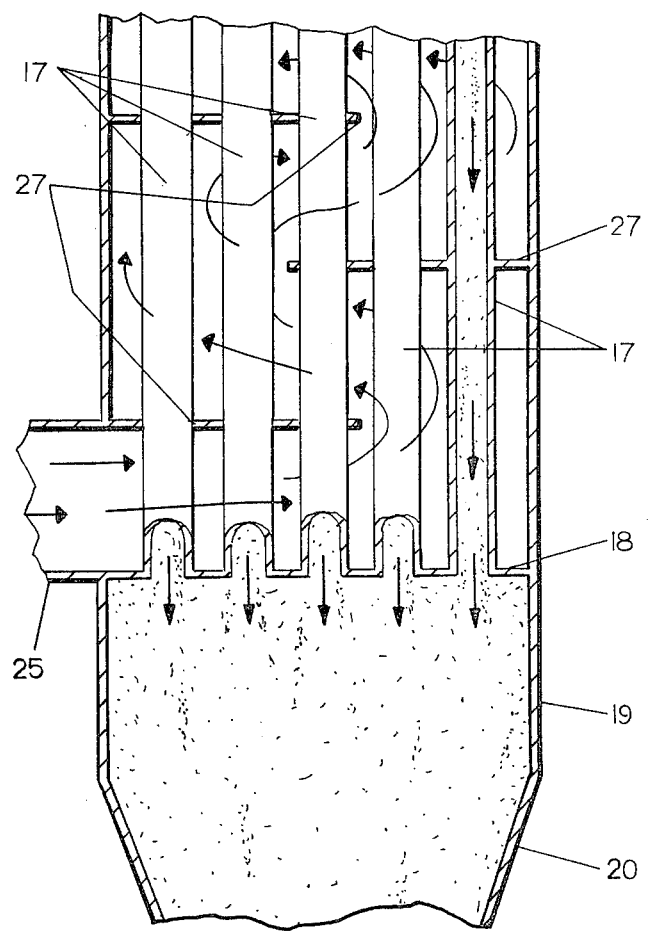

Referring to the drawings, a glass melting furnace 10 of the regenerative type having a bottom of fire brick, whereon the melt of glass forming ingredients are deposited, is indicated schematically in FIG. 1. Gas and air are normally mixed and burned in the furnace above the glass forming materials, and the resulting heat melts the mixed materials to a mass of molten glass, which is delivered or worked from one ene following refining. The regenerative or heat-accumulating chambers or passageways are normally located beneath the furnace melting chamber.

The gas and air are usually passed through the regenerative passages beneath the furnace bottom for preheating and through side ports which lead into the furnace melting chamber where they are burned to melt the glass forming materials. The hot waste gases are then passed through opposite side ports and then through the regenerative passages for heat recovery and then to flue ducts and a discharge stack. After a limited period of operation in this manner, the path of travel of the incoming gas and air is switched, by suitable dampers and timers, so that the combustible gases then enter the melting chamber from opposite ports, the hot waste gases then passing off through opposite flue passages and ducts to the stack. By the alternate use of the regenerative passages for incoming fuel and outgoing hot waste gases, the incoming fuel is preheated by the bricks of the regenerative passages which have been heated by the escaping flue gases which previously passed therethrough. All of the foregoing description pertains to well known glass furnace construction and is merely set forth by way of example. The waste gases from the furnace, the preheated combustion air from the furnace, or supplementary atmospheric air which has been suitably preheated, may be employed to operate the batch preheater.

In accordance with the present invention, a preheater 11 is mounted adjacent to the batch feeding end of the glass furnace at an elevation higher than the normal elevation of the furnace batch chargers 12. The glass forming ingredients in suitably intermixed condition are delivered to the top of the preheater 11 by any suitable means such as a vertical elevator 32. The vertical elevator may consist of any endless chain or bucket-type arrangement of standard construction, capable of taking the glass forming mixture from a pile or hopper and delivering it into a chute through which it passes into the top of the preheater 11. The glass forming mixture comprises the normal intermixed batch constituents and may or may not contain broken cullet for forming the glass melt. The cullet normally has a size ranging from about $\frac{1}{8}$ inch to 1 inch. U.S. mesh size, and the smaller size being preferred for passage through the preheater to prevent bridging.

The preheater typically comprises a vertical chamber 13 having a rectangular cross-section with a frusto-pyramidal top cover 14. The main mass of glass batch is delivered through a chute 15 into the bottom area of vertical elevator 32 for delivery to the top of preheater 11. Between the enclosed top cover and the main body portion of the preheater is located an interior horizontal upper plate 16 into which a plurality of open-ended tubes 17 are headed at their upper ends. The tubes are mounted in spaced-apart array in parallel, vertical alignment for passage of the glass batch therethrough. The tubes preferably have about a 4 inch internal diameter and extend throughout the central portion of the preheater to an interior horizontal lower plate 18 into which they are similarly headed. Thus, the central portion of the preheater comprises a shell and tube arrangement. The number of tubes and dimensions of the preheater will depend upon the size of the glass melting furnace with which it is used, and the desired conditions of use. The tubes are mounted on about 6 to 8 inch centers where 4 inch internal diameter tubes are employed, the corner tubes usually being omitted where the preheater has a rectangular or square horizontal cross-section. The tubes are preferably comprised of carbon or stainless steel for long term use without rusting or corrosion, and are normally equi-spaced for optimum particulate batch flow.

The lower region of the preheater comprises a frusto-pyramidal bottom hopper 20 into which the open-ended tubes 17 deliver the heated glass batch. The bottom hopper terminates at its lower extremity into a screw-driven batch removal chamber 21 which interconnects with a diverter valve 22. The diverter valve has a Y-shaped exit portion for directing the major portion of the heated glass batch through a chute 23 to a batch charger 24. The batch charger is capable of delivering the heated glass batch into the furnace 10 through a screw-driven feed member or other means as known in the art.

Immediately above the bottom interior header member 18 of the preheater, an incoming waste gas duct 25 is mounted for delivering hot waste gases into a lower region of the preheater. The duct is designed to open out into a relatively-flat, wide duct inlet having a width comparable to the preheater for introducing the hot gases across its full width.

Immediately below the upper interior header member 16 of the preheater, an outgoing waste gas duct 26 for removing hot waste gases from an upper region is mounted. The duct consists of a relatively-flat, wide duct outlet having a width comparable to the preheater for removing the hot gases across its full width.

A plurality of flat buffle plates 27 is mounted in spaced-apart, staggered relation within the preheater between the upper and lower interior plates 16 and 18. The baffle plates 27 have openings therein through which the tubes 17 extend between their upper and lower extremities. The baffle plates are able to direct the upwardly coursing hot waste gases in a circuitous path to provide turbulence to the gases and thereby improved heat transfer to the tubes and the glass batch moving downwardly by gravity therewithin.

The batch mixture passes gradually and continuously through the preheater from top to bottom. It is then delivered, uniformly heated and well mixed from the bottom hopper region of the preheater to the glass batch charger 24 of the furnace. The glass batch is thus advanced slowly and continuously downwardly to the furnace area for melting.

The glass batch in the preheater is indirectly heated by the hot waste gases which are taken from the furnace prior to their arrival at the stack. As shown, the hot gases enter the bottom region of the preheater near the lower end of the tubes and above lower plate 18, the gases then passing in a serpentine path around the baffle plates 27 to the top of the preheater at upper plate 16, and then escaping from the preheater through outgoing duct 26. Inlet and outlet ducts 25 and 26 may be provided with dampers so that the flow of hot gases through the preheater may be accurately regulated. The gases passing in countercurrent flow to the descending glass forming materials, within the tubes, moves between and around the tubes heating the same, and the contained glass batch indirectly. Further, the hottest gases thus act upon the hottest portion of the glass forming constituents in the lower area of the preheater, adding a further increment to its heat before it passes into the melting furnace. As stated hereabove, the hot gas stream may be comprised of waste gases from the furnace heating zone or preheated air from the furnace checkers area, or preheated outside air which has been supplementally heated prior to delivery to the batch preheater.

By proper design of the upper and lower hopper sections of the preheater, such areas having generally frusto-pyramidal shapes, relatively-uniform and smooth flow of the batch materials through the entire vertical height of the preheater is attained. Thus, flow rates of the batch through all of the heat exchanger tubes, to maintain the same virtually-full at all times, is obtained for uniform amounts of preheat. The preferred form of construction is having a straight section with rounded corners at an upper region above the tubes, and a wedge-shaped hopper with rounded corners at the bottom at the tube lower ends for continuous movement of the hot, dry batch. A sufficient head is thereby maintained over the tubes to secure such flow, along with a suitable feeder unit to remove preheated material from the bottom of the hopper.

The diverter valve 22 serves to separate the downwardly flowing stream of glass batch mixture into major and minor portions. The major portion is delivered into the batch charger 24 through chute 23, while the minor portion is delivered into chute 30 where it is mixed with incoming cold batch from the supply source. The hot and cold batch is then conveyed downwardly to the bottom of vertical conveyor 32 which serves to elevate the batch and deliver same into the top of the preheater through inlet chute 33.

Through proper proportioning and thorough mixing of the recirculated, hot batch fraction and the newly-incoming cold batch fraction, uniform and continuous operation of the preheater apparatus can be practiced. This can be accomplished when the temperature conditions, and the flow of gases and batch material are properly adjusted. Such uniform operation permits the maintenance of substantially-constant conditions within the preheater for delivering significantly-hotter glass batch to the furnace, greatly increasing the furnace efficiency.

The temperature of the stack gases entering the preheater will vary with furnace conditions, of course; however, they will normally be from 900° F. to 1100° F. and will frequently average about 1000° F. for substantial periods. The gases leaving the preheater will range from about 400° F. to 600° F., averaging about 500° F.

Obviously, additional heating means for the preheater may be provided, if desired, although the waste furnace gases are usually fully adequate for most economical operation. The waste gases or hot air normally enter the preheater at a temperature ranging from about 900° F. to 1100° F., after leaving the furnace combustion or checkers area. As stated, preheated combustion air which has passed through the furnace heat-recovery area can also be used to heat the batch in the preheater, or a separate supplemental heat source such as a burner may be used. The waste gases, or hot air, normally leave the preheater at a temperature of about 400° F. to 600° F.

The glass batch mixture usually enters the top of the preheater at about 250° F. and leaves the preheater at the diverter valve 22 having a temperature ranging from about 800° F. to 1000° F. The foregoing temperatures are attainable with the amount of recirculated batch ranging from about 25 to 30 percent by weight. Such temperatures are possible with a glass furnace which is capable of manufacturing about 240 tons per day of product.

The present invention is capable of continuous operation when the glass batch in the cooler upper region of the preheater is kept above the boiling point temperature of water. When the batch temperature in such region is allowed to fall below the boiling point of water, the residual moisture within the batch is able to condense within the tubes, and within the top cover member 14 of the preheater, causing pluggage of the tubes and bridging of the normally-flowable mass. Such pluggage prevents optimum operation of the preheater and cannot be tolerated in long-term operation. By keeping all surfaces of the preheater contacted by the batch above the dew point temperature or boiling point temperature of the water contained in the batch, batch adherance to contacted surfaces can be prevented and smooth flow maintained.

The present invention is not limited to the interaction of one preheater to one melting furnace, the former being connected with hot gases leading to one stack. If desired, one preheater may be connected to serve a number of melting furnaces, or a number of preheaters may be associated with one furnace and the waste gases emitting therefrom.

The present invention can also be employed to heat individual glass batch constituents such as sand, limestone, soda ash, etc. to remove moisture therefrom prior to their introduction into a melting furnace, for example. Further, glass cullet, or mixtures of glass batch and cullet, in widely ranging ratios can also be heated in the apparatus and by the method of this invention, so long as the particulate material has one or more volatile components therein which tends to condense within the heating apparatus. Such batch constituents may be individually or combinedly heated to temperatures ranging from about 600° F. to 800° F. The glass cullet when heated alone may be heated to even higher temperatures.

The mixed batch and cullet can be heated by recycling up to a weight percentage of about 70% cullet or higher, the recycling preventing pluggage of the tubes in cooler areas of the tubes due to moisture condensation. Virtually all areas of the tubes, and especially their upper areas, are maintained at a temperature above the boiling point temperature of water, i.e., 212° F. The particulate material to be heated can contain a volatile constituent such as water or a decomposable constituent which produces water on decomposition. Such constituents can be readily eliminated on heating without interrupting the continuous gravity flow of the particulate material through the heating apparatus.

Various modifications may be resorted to within the spirit and scope of the appended claims.

We claim:

1. The process of continuously preheating glass batch prior to its delivery to a glass melting furnace comprising the steps of introducing the fully-intermixed glass batch constituents into the upper region of a tubular heat exchanger, allowing the glass batch to flow downwardly by gravity through a plurality of open-ended tubes of said heat exchanger, passing hot gases upwardly through said heat exchanger around said open-ended tubes to heat the glass batch contained therein by counter-current indirect heat transfer, during the normal continuous process separating a minor portion of the heated glass batch from the major portion thereof adjacent the bottom of said heat exchanger and returning said minor portion to the upper region of said heat exchanger for recirculation, and delivering the major portion of said heated glass batch from the bottom of said heat exchanger into the glass melting furnace.

2. The process in accordance with claim 1, wherein hot gases from said glass melting furnace are directed upwardly in a circuitous countercurrent path around said open-ended tubes by a series of spaced-apart baffles to achieve greater indirect heat transfer.

3. The process in accordance with claim 1, wherein a minor portion of about one-third of the mass of glass batch is recirculated through the said heat exchanger to eliminate residual moisture condensation within or above said tubes by maintaining the glass batch passing through said heat exchanger above the boiling point of water.

4. The process in accordance with claim 1, wherein the minor portion of said heated glass batch is directed by a diverter valve located adjacent the lower region of said heat exchanger to a vertical elevator for recirculation.

5. The process in accordance with claim 1, wherein the major portion of said heated glass batch is diverted to a glass batch charger connected to said glass melting furnace, said diversion being effected by a diverter valve located adjacent the lower region of said heat exchanger.

6. The process in accordance with claim 1, including the step of maintaining the glass batch within said heat exchanger above the boiling point temperature of the residual moisture in said glass batch.

7. The process in accordance with claim 1, wherein the said glass batch is heated to a temperature ranging from about 800° to 1000° F. for delivery of said major portion to said glass melting furnace and recirculation of said minor portion through said heat exchanger.

8. The process in accordance with claim 1, wherein the minor portion of said glass batch is recirculated to an upper region of said heat exchanger at an incoming temperature above 212° F.

9. The process in accordance with claim 1, wherein the said glass batch is passed through open-ended tubes of said heat exchanger having uniform dimensions of about 4 inch internal diameter.

10. Combined apparatus for continuously preheating glass furnace batch comprising an elongated vertically-mounted heat exchanger having a plurality of open-ended tubes extending throughout a major portion of its height, means for delivering glass batch in fully inter-mixed condition to an upper region of said heat exchanger for its passage by gravity through said open-ended tubes, means for introducing hot gases from said glass furnace into a lower region of said heat exchanger to circulate upwardly between the said open-ended tubes, baffle means mounted around said tubes to direct said hot gases in a circuitous path around said tubes and out of contact with said glass batch for indirect heat transfer, and means for separating a minor portion of said glass batch from the major portion thereof during the normal continuous process and returning said minor portion to the said upper region of said heat exchanger, the major portion of said glass batch being delivered to a batch charger of said glass furnace.

11. The combined apparatus in accordance with claim 10, wherein said means for introducing said hot gases into a lower region of said heat exchanger comprises a hollow duct leading from the furnace combustion chamber to said heat exchanger.

12. Combined apparatus in accordance with claim 10, wherein said means for separating a minor portion of said glass batch comprises a diverter valve.

13. Combined apparatus in accordance with claim 10, wherein said baffle means comprises a series of baffle plates extending in staggered spaced-apart horizontal relation as a vertical array within said heat exchanger around said open-ended tubes.

14. In the manufacture of glass, combined apparatus for continuously preheating glass batch constituents comprising a glass melting furnace, a hollow duct for conveying hot gases therefrom, an elongated preheater for the glass batch constituents mounted vertically adjacent to said glass melting furnace at an elevation higher than said furnace, open-ended tubes extending through the major central portion of said preheater for conveyance of said glass batch constituents by gravity, said hollow duct being connected to a lower region of said preheater for introducing the hot gases thereinto for passage upwardly around said tubes, baffle means mounted around said tubes for directing said hot waste gases therearound in a circuitous countercurrent path for indirect heat transfer to said glass batch constituents, and means for separating major and minor amounts of the heated glass batch constituents at a lower region of said preheater during the normal continuous process, the minor amount being returned to an upper region of said preheater for recirculation through said preheater and the major amount being delivered to a batch charger of said glass melting furnace.

15. Combined apparatus in accordance with claim 14, wherein said baffle means comprises a plurality of flat plates extending in staggered spaced-apart horizontal relation within said preheater around said open-ended tubes to provide a serpentine countercurrent gas flow.

16. Combined apparatus in accordance with claim 14, wherein said open-ended tubes have generally uniform length and a uniform internal diameter of not less than about 2 inches.

17. Combined apparatus in accordance with claim 14, wherein said means for separating major and minor amounts of the heated glass batch constituents comprises a diverter valve located closely adjacent the lower region of said preheater.

18. Combined apparatus in accordance with claim 14, wherein said elongated preheater has a rectangular cross section and the open-ended tubes are equi-spaced in vertical array in a shell-and-tube arrangement for transporting said glass batch constituents downwardly by gravity.

19. A process for continuously heating a particulate material such as glass batch, individual glass batch constituents, glass cullet, mixtures thereof, and the like, which contain a volatile condensible constituent, comprising the steps of introducing the particulate material into the upper region of an elongated vertically-mounted hollow enclosed tubular heat exchanger, allowing the particulate material to flow downwardly by gravity through a plurality of open-ended tubes of said heat exchanger, passing hot gases upwardly through said heat exchanger around said open-ended tubes to heat the particulate material contained therein by countercurrent indirect heat transfer, during the normal continuous process separating a minor portion of the heated particulate material from the major portion thereof adjacent a lower region of said heat exchanger, returning said minor portion to the upper region of said heat exchanger for recirculation, and delivering the major portion of said particulate material from the lower region of said heat exchanger in heated condition essentially free of said volatile condensible constituent.

20. The process in accordance with claim 19, wherein a minor portion of about one-third of the mass of particulate material is recirculated through the said heat exchanger to eliminate residual moisture condensation within or above said tubes by maintaining the particulate material passing through said heat exchanger above the boiling point of water.

21. The process in accordance with claim 19, wherein the minor portion of said particulate material is recirculated to an upper region of said heat exchanger at an incoming temperature above 212° F.

22. The process in accordance with claim 19, wherein the said particulate material is passed through a plurality of open-ended tubes of said heat exchanger having uniform dimensions of about 4 inch internal diameter.

23. The process in accordance with claim 19, wherein the said particulate material is heated to a temperature ranging from about 800° F. to 1000° F. for delivery of the major portion of said particulate material to a melting furnace and recirculation of said minor portion through said heat exchanger.

24. The process in accordance with claim 19, including the step of maintaining the particulate material within said heat exchanger above the boiling point temperature of the residual moisture in said particulate material.

25. The process in accordance with claim 19, including the step of directing hot gases from a glass melting furnace upwardly in circuitous countercurrent path around said open-ended tubes by a series of spaced apart baffles to achieve greater indirect heat transfer.

26. A heat exchanger for continuously heating a particulate material such as glass batch, individual glass batch constituents, glass cullet, mixtures thereof, and the like, which contain a volatile condensible constituent, comprising an elongated vertically-mounted hollow enclosed chamber having a plurality of open-ended hollow tubes extending throughout a major portion of its height, means for delivering the particulate material to an upper region of said heat exchanger for its passage by gravity through said open-ended hollow tubes, means for introducing hot gases into a lower region of said heat exchanger to circulate upwardly between the said open-ended tubes, baffle means mounted around said tubes intermediate their ends to direct said hot gases in a circuitous path around said tubes and out of contact with said particulate material for indirect heat transfer, and means for separating a minor portion of the heated particulate material from the major portion thereof at a lower region of said heat exchanger during the normal continuous process, means for returning said minor portion to the upper region of said heat exchanger, and means for delivering the major portion of said particulate material at a lower region of said heat exchanger in heated condition essentially free of said volatile condensible constituent.

27. A heat exchanger in accordance with claim 26, wherein said baffle means comprises a series of baffle plates extending in staggered spaced-apart horizontal relation as a vertical array within said heat exchanger around said open-ended tubes.

28. A heat exchanger in accordance with claim 26, wherein said means for separating a minor portion of said particulate material comprises a diverter valve.

29. A heat exchanger in accordance with claim 26, wherein said means for introducing hot gases into a lower region of said heat exchanger comprises a hollow duct leading from a melting furnace to said heat exchanger.

30. A heat exchanger in accordance with claim 26, wherein said means for returning said minor portion of the heated particulate material to the upper region of said heat exchanger comprises a bucket elevator and connecting ducts.

31. A heat exchanger in accordance with claim 26, wherein said open-ended hollow tubes have generally uniform length and uniform internal diameter of not less than about two inches.

32. A heat exchanger in accordance with claim 26, wherein said elongated enclosed chamber has a rectangular cross-section and the open-ended tubes are equi-spaced in vertical array in a shell-and-tube arrangement for transporting the particulate material downwardly by gravity.

* * * * *